(12) United States Patent
Routeau et al.

(10) Patent No.: US 9,267,336 B2
(45) Date of Patent: Feb. 23, 2016

(54) METHOD FOR CONNECTING A FLEXIBLE LINE TO A STRUCTURE OF A FLUID EXPLOITATION INSTALLATION AND ASSOCIATED CONNECTION DEVICE

(75) Inventors: Sylvain Routeau, Saint Cloud (FR); Frédérick Vergne, Gif sur Yvette (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/342,843

(22) PCT Filed: Sep. 5, 2012

(86) PCT No.: PCT/EP2012/067271
§ 371 (c)(1),
(2), (4) Date: Apr. 8, 2014

(87) PCT Pub. No.: WO2013/034574
PCT Pub. Date: Mar. 14, 2013

(65) Prior Publication Data
US 2014/0212221 A1    Jul. 31, 2014

(30) Foreign Application Priority Data
Sep. 7, 2011   (FR) ...................................... 11 57958

(51) Int. Cl.
*E21B 17/01* (2006.01)
*E21B 43/01* (2006.01)
*E21B 19/00* (2006.01)
(Continued)

(52) U.S. Cl.
CPC ............. *E21B 17/017* (2013.01); *E21B 19/004* (2013.01); *E21B 43/0107* (2013.01); *F16B 7/22* (2013.01); *F16B 7/182* (2013.01); *Y10T 29/49908* (2015.01)

(58) Field of Classification Search
CPC . E21B 17/017; E21B 43/0107; E21B 19/004; F16B 7/22; F16B 7/182
See application file for complete search history.

(56) References Cited

U.S. PATENT DOCUMENTS

| | | | |
|---|---|---|---|
| 6,367,554 B1 * | 4/2002 | Theiss | 166/365 |
| 6,422,316 B1 * | 7/2002 | Schutz et al. | 166/367 |
| 6,536,527 B2 * | 3/2003 | Munk et al. | 166/345 |

(Continued)

FOREIGN PATENT DOCUMENTS

| | | |
|---|---|---|
| CN | 201 677 169 | 12/2010 |
| EP | 1 561 957 A2 | 8/2005 |

(Continued)

OTHER PUBLICATIONS

Routeau et al., Machine translation FR 2926346A1; All; Jul. 17, 2009.*
International Search Report dated Oct. 12, 2012 issued in corresponding International patent application No. PCT/EP2012/067271.
Written Opinion dated Oct. 12, 2012 issued in corresponding International patent application No. PCT/EP2012/067271.

*Primary Examiner* — Benjamin Fiorello
(74) *Attorney, Agent, or Firm* — Ostrolenk Faber LLP

(57) ABSTRACT

The method according to the invention comprises providing a flexible line (18) and a bend limiter axially immobilized around the flexible line (18) by a releasable immobilizing mechanism (46). It includes partially inserting the flexible line (18) through a hollow rigid member (40), immobilizing the bend limiter on the hollow rigid member (40), and deactivating the releasable immobilizing mechanism (46). The releasable immobilizing mechanism (46) is deactivated independently of the movement of the flexible line (18) relative to the bend limiter.

14 Claims, 8 Drawing Sheets

(51) Int. Cl.
*F16B 7/22* (2006.01)
*F16B 7/18* (2006.01)

(56) References Cited

U.S. PATENT DOCUMENTS 7,293,940 B1 * 11/2007 Perreau-Saussine
    et al. .......................... 405/224.2
7,467,914 B2 * 12/2008 Finn et al. .................. 405/224.3
7,472,755 B2 * 1/2009 Riggs ............................ 166/365
8,016,520 B2 * 9/2011 Dybvik et al. ................ 405/224

FOREIGN PATENT DOCUMENTS

| FR | 2 926 346 A1 | 7/2009 |
| GB | 2 463 471 | 3/2010 |
| GB | 2 469 829 | 11/2010 |
| WO | WO 98/23845 | 6/1998 |
| WO | WO 2009/156639 A1 | 12/2009 |

* cited by examiner

METHOD FOR CONNECTING A FLEXIBLE LINE TO A STRUCTURE OF A FLUID EXPLOITATION INSTALLATION AND ASSOCIATED CONNECTION DEVICE

CROSS REFERENCE TO RELATED APPLICATIONS

The present application is a 35 U.S.C. §371 National Phase conversion of PCT/EP2012/067271, filed Sep. 5, 2012, which claims benefit of French Application No.11 57958, filed Sep. 7, 2011, the disclosure of which is incorporated herein by reference. The PCT International Application was published in the French language.

TECHNICAL FIELD OF THE INVENTION

The present invention relates to a method for connecting a flexible line to a structure of a fluid exploitation installation, comprising the following steps:
 providing a flexible line and a bend limiter axially immobilized around the flexible line by a releasable immobilizing mechanism;
 partially inserting the flexible line through a hollow rigid member secured to the structure;
 immobilizing the bend limiter on the hollow rigid member;
 deactivating the releasable immobilizing mechanism;
 moving the flexible line relative to the bend limiter in the hollow rigid member, the bend limiter remaining substantially axially stationary relative to the hollow rigid member.

BACKGROUND OF THE INVENTION

Such a method is in particular implemented in hydrocarbon exploitation solutions passing through an expanse of water, for example comprising a rigid structure fixed on the sea bottom or a floating structure such as a naval surface support, a semi-submersible platform, a floating riser, or a ship.

The flexible line to be connected on the structure is for example a flexible rising fluid transport pipe, also referred to as a riser. "Flexible pipes" refers to those described in the normative documents published by the American Petroleum Institute (API), API 17J and API RP 17 B and well known by those skilled in the art. More generally, the flexible line may be a composite bundle, a set of umbilicals or electrical cables.

The method of the aforementioned type is used during the installation and connection of the flexible line on the surface structure.

To that end, to reduce the risks of damage to the structure and the flexible line, it is known to submerge the flexible line in the expanse of water below the surface structure, and to raise it up to the connection area situated on the surface structure using a winch. Such a connection is referred to as a "pull-in".

The flexible line is guided on the structure by inserting it through a hollow rigid tube secured to the structure, oriented vertically, which constitutes a protective sleeve. The hollow tube is for example of the "I-tube" or "J-tube" type.

At the upper output of the tube, the flexible line is connected on the surface installation.

To avoid deteriorating the flexible line, in particular under the effect of the agitation of the water that may cause it to come into contact with the structure, it is known to mount a bend limiter, engaged around the flexible line, capable of locally imposing a bend radius greater than the minimum bend radius that the flexible line may occupy.

In the rest of the text, "bend limiter" refers to bend limiters for example made up of hinged rigid elements called "vertebrae", and limiters for example made up of multiple blocks of plastic material, as well as combinations of those elements.

A bend limiter is for example positioned around the flexible line in the vicinity of its upper end to cooperate with the hollow tube during the insertion of the flexible line into the tube.

To that end, first, the bend limiter and the flexible line are moved jointly toward the lower end of the hollow tube until the limiter is partially inserted into the hollow tube. Then, secondly, the flexible line is moved upward relative to the bend limiter to raise it through the hollow tube in order for it to be connected on the surface structure.

During the second phase, the bend limiter is kept immobile in translation in the hollow tube by embedding and/or fastening using gripping collars.

WO 98/23845 describes a method using a single winch to pull the flexible line and the bend limiter while temporarily securing the bend limiter to the flexible line using a frangible pin.

During the raising of the bend limiter toward the lower end of the hollow tube, the bend limiter and the flexible line move jointly. The bend limiter is then fastened to the lower end of the tube. Sufficient upward traction is then applied on the flexible line so as to break the frangible pin to allow the upward movement of the flexible line relative to the bend limiter.

Such a method is not fully satisfactory. In fact, to allow the release of the flexible line relative to the bend limiter, it is necessary to move the line locally relative to the bend limiter to cause the frangible pins to break. Such movement results from the implementation of an upward traction force on the flexible line. Such a force may deteriorate the pipe.

Furthermore, the method is complex and requires great reliability of the mechanical parts inserted between the flexible line and the bend limiter.

SUMMARY OF THE INVENTION

One aim of the invention is to obtain a method for connecting a flexible line on a structure of a fluid exploitation installation that is easy and reliable to use, with a very limited risk of deterioration of the flexible line.

To that end, the invention relates to a method of the aforementioned type, characterized in that the releasable immobilizing mechanism is deactivated independently of the movement of the flexible line with respect to the bend limiter.

The method according to the invention may comprise one or more of the following features, considered alone or according to any technically possible combination:
 the releasable immobilizing mechanism includes a retaining member secured to one of the flexible line and the bend limiter and a moving engaging member, capable of being placed in an engaging configuration of the retaining member, the deactivating step including moving the moving member from the engaging configuration toward a release configuration of the retaining member, independently of the movement of the flexible line.
 the releasable retaining member includes an actuator, advantageously a hydraulic actuator, the actuator being driven during the deactivating step to allow the passage of each moving member from its engaged configuration to its release configuration.
 the releasable immobilizing member includes a retaining cage for the moving member, and during the deactivating step, the actuator moves the retaining cage between a first position keeping each moving member in the engaged configuration, and a second position in which each moving member is able to go into its released configuration.

the flexible line includes at least one bearing flange, the bend limiter including a retaining flange applied on the bearing flange when the releasable immobilizing mechanism is activated, the releasable immobilizing mechanism keeping the bearing flange pressed on the retaining flange during the immobilization of the bend limiter on the hollow rigid member, the bearing flange being free to move relative to the retaining flange after deactivation of the releasable immobilizing mechanism.

the hollow rigid member includes at least one retaining collar, the bend limiter including at least one pre-fastening member on the collar, the engagement of the bend limiter on the hollow rigid member including the engagement of the pre-fastening member on the collar.

the method includes, after the step for deactivating the releasable immobilizing member, the permanent fastening of the bend limiter on the hollow rigid member using at least one fastening member.

The invention also relates to a connecting device, designed to be mounted on a structure of a fluid exploitation installation, including:
a flexible line;
a hollow rigid member designed to be fastened on the structure, the flexible line being designed to be engaged through the hollow rigid member;
a bend limiter engaged around the flexible line, the bend limiter being designed to be axially immobilized on the hollow rigid member;
a releasable axial immobilizing mechanism for the flexible line on the bend limiter;
characterized in that the releasable immobilizing mechanism is capable of being deactivated independently of the movement of the flexible line relative to the bend limiter.

The device according to the invention may comprise one or more of the following features, considered alone or according to any technically possible combination:
the releasable immobilizing mechanism includes a retaining member secured to one of the flexible line and the bend limiter and a moving engaging member, capable of being placed in an engaging configuration of the retaining member, the moving member being movable from the engaging configuration to a release configuration of the retaining member independently of the movement of the flexible line.

the releasable retaining mechanism includes an actuator, advantageously a hydraulic actuator, the actuator being controllable then to allow the passage of each moving member from the engaged configuration to its released configuration.

the releasable immobilizing mechanism includes a cage for retaining the moving member, and the actuator can be controlled to move the retaining cage between a first position keeping each moving member in the engaged configuration and a second position in which each moving member is capable of going into its released configuration.

the flexible line includes at least one bearing flange, the bend limiter including a retaining flange pressed on the bearing flange when the releasable immobilizing mechanism is activated, the releasable immobilizing mechanism keeping the bearing flange pressed on the retaining flange during the immobilization of the bend limiter on the hollow rigid member, the bearing flange being free to move relative to the retaining flange after the releasable immobilizing mechanism is deactivated.

the hollow rigid member includes at least one retaining collar, the bend limiter including at least one pre-fastening member on the collar.

the device includes at least one fastening member for fastening the bend limiter on the collar capable of axially immobilizing the bend limiter relative to the collar.

BRIEF DESCRIPTION OF THE DRAWINGS

The invention will be better understood upon reading the following description, provided solely as an example, and done in reference to the appended drawings, in which.

DESCRIPTION OF PREFERRED EMBODIMENTS

Figure 1:
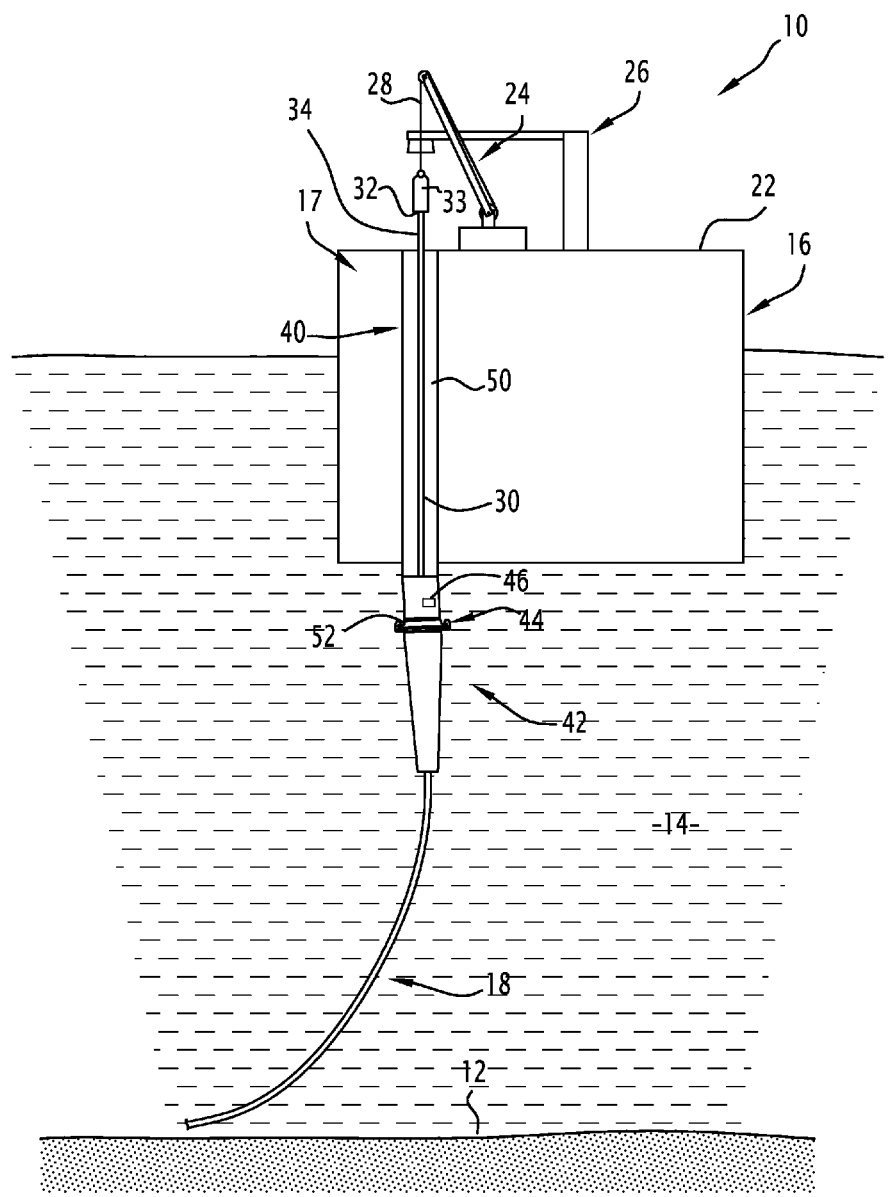
FIG. 1 is a diagrammatic view, in cross-section along a median vertical plane, of a fluid exploitation installation including a first connecting device according to the invention.

FIG. 1 illustrates a fluid exploitation installation 10 according to the invention. This installation 10 is for example designed to collect a fluid, in particular a hydrocarbon withdrawn from the bottom 12 of the expanse of water 14, or to transfer the hydrocarbon to a carrier ship.

The installation 10 comprises a structure 16 floating on the expanse of water and a connection device 17 according to the invention including a flexible line 18 designed to be connected on the structure 16.

The expanse of water 14 is for example a lake, sea or ocean. The depth of the expanse of water at the floating structure 16 is for example comprised between 15 m and 3000 m.

The floating structure 16 is for example a naval surface support, a semi-submersible platform, a floating riser, or a ship.

Alternatively, the structure 16 is a fixed rigid structure of the "jacket" type or an oscillating structure subjected to the bottom of the sea.

The structure 16 has an upper surface 22 on which a maneuvering winch 24 for maneuvering the flexible line 18 is advantageously mounted and a manifold 26 suitable for connecting one end of the flexible line 18.

The winch 24 advantageously comprises a single cable 28 that can be deployed to pull the flexible line 18.

In the example shown in FIG. 1, the flexible line 18 is a flexible fluid transport tubular pipe 30 inwardly delimiting a fluid circulation passage. This pipe, also called a riser, is designed to connect a collection assembly (not shown) situated on the bottom 12 of the expanse of water to the manifold 26 situated on the surface 22 of the floating structure 16.

Alternatively, the flexible line 18 is for example a composite bundle of the umbilical or "integrated service umbilical" (ISU) or IPB type well known by those skilled in the art and described in the normative documents published by the American Petroleum Institute (API) API RP 17 B paragraph 4.3.4. Alternatively, the flexible line 18 may be a bundle of electrical cables.

At its upper end 32, the pipe 30 has a head 33 for connecting to the working line cable 28.

Figure 2:
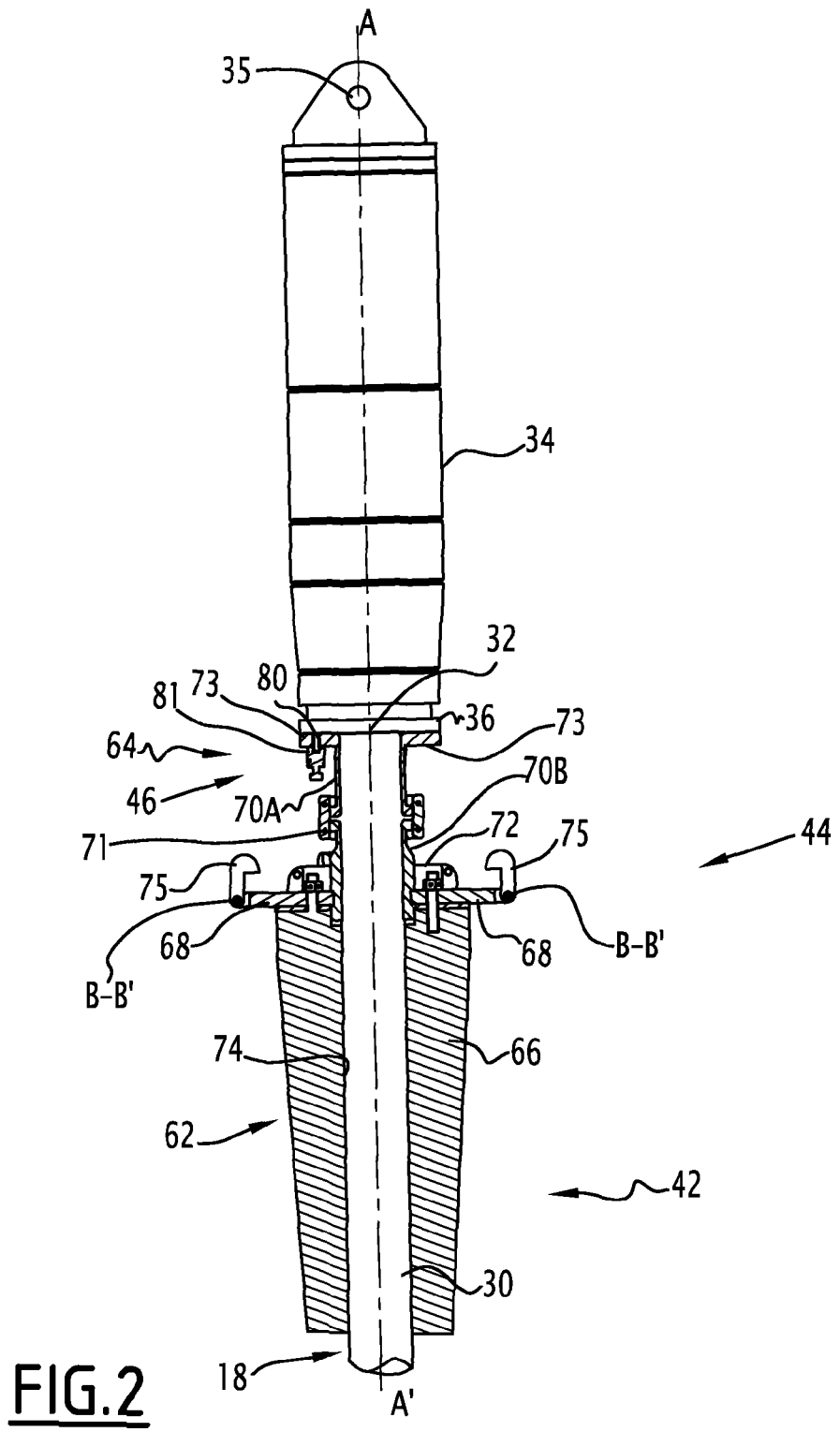
FIG. 2 is a partial cross-sectional view, along an axial plane, of the flexible line designed to be mounted on the installation of FIG. 1, provided with a bend limiter connected on the line by a releasable immobilizing mechanism.

As illustrated by FIG. 2, the head 33 comprises a connection sleeve 34 fastened to the upper end of the pipe 30 and an eyelet 35 for inserting the lower end of the working line cable 28. The eyelet 35 is advantageously rotatably mounted on an upper part of the sleeve 34 around a circulation axis A-A' of the line 18, corresponding to the longitudinal axis A-A' of the line 18.

The head 33 further includes a lower bearing flange 36 extending transversely relative to the longitudinal axis A-N.

The pipe 30 is for example unwound and submerged in the expanse of water 14 from a surface placement ship and is stored on the bottom 12 of the expanse of water 14, then the end of the pipe 30 (section not placed on the sea bottom) is abandoned on the bottom 14 via an abandonment cable.

Aside from the flexible line 18, the connecting device 17 comprises a hollow rigid tube 40 for guiding and protecting the tubular line 18, secured to the structure 16, a local bend limiter 42 for limiting the bend of the line 18, engaged around the line 18 separated from the upper end 32, and an assembly 44 for fastening the bend limiter 42 to the lower end of the hollow rigid tube 40.

According to the invention, the device 17 further comprises a releasable mechanism 46 for axially immobilizing the bend limiter 42 on the flexible line 18.

In the example shown in FIG. 1, the hollow rigid tube 40 is a straight tube of the "I-tube" type. Alternatively, the tube 40 is a "J-tube" that has a straight vertical upper part and a bent lower part.

The tube 40 comprises a hollow vertical sleeve 50, secured to the structure 16, and a lower end collar 52 situated at the lower end of the sleeve 50.

The sleeve 50 delimits an inner passage that emerges in the expanse of water 14 at the lower end and that emerges at its upper end in the vicinity of the upper surface 22 of the structure, above the expanse of water 14.

The end collar 52 is submerged in the expanse of water 14.

Figure 3:
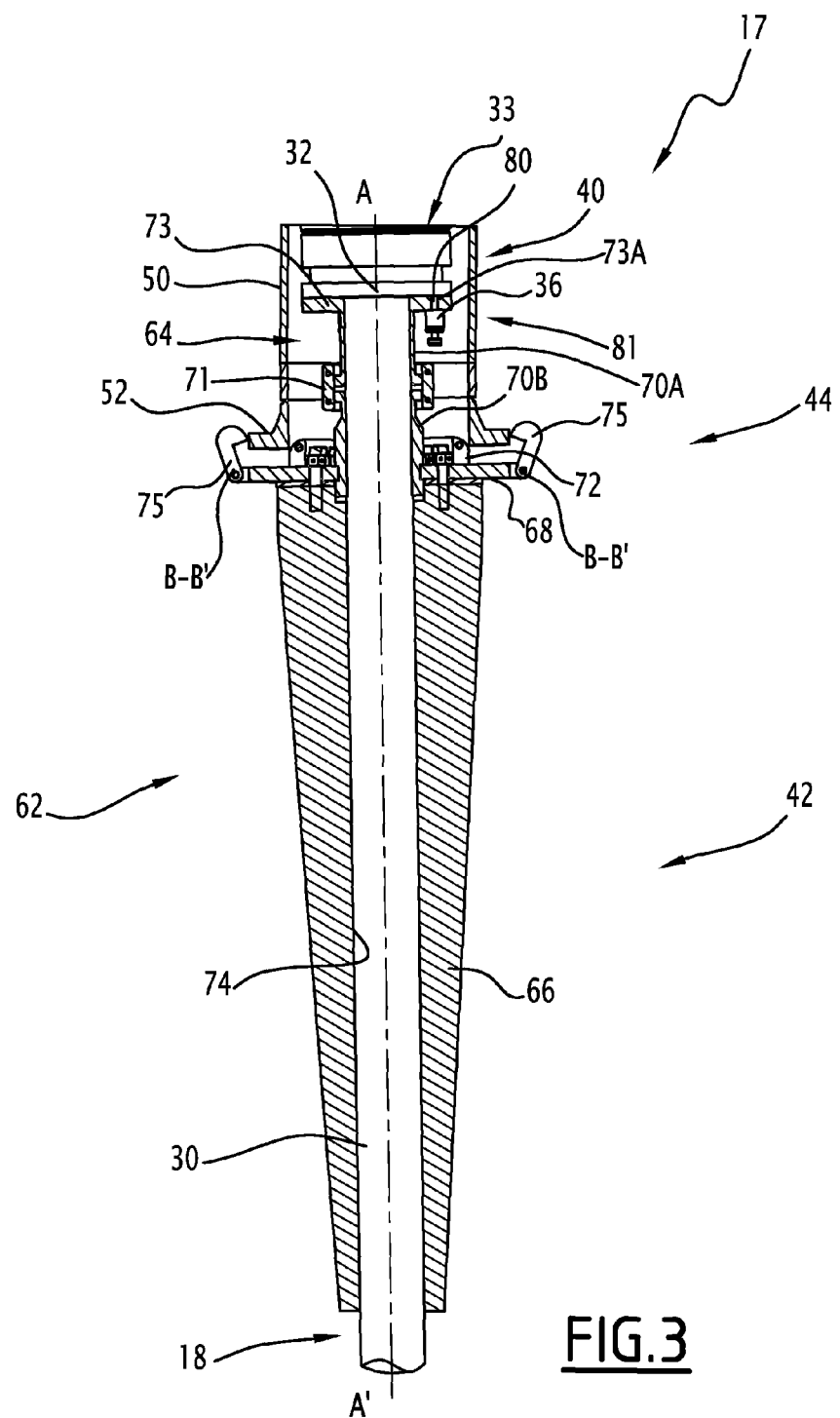
FIG. 3 is a view similar to FIG. 2, during a first step for carrying out a connecting method according to the invention.

In this example, the bend limiter 42 comprises, from bottom to top in FIGS. 2 and 3, a rigid lower assembly 62 and a hinged upper assembly 64, connected on the flexible lower assembly 62.

The flexible lower assembly 62 includes a stiffening block 66 and an intermediate fastening flange 68 on the hollow rigid tube 40.

The lower block 66 is for example molded from a plastic material such as polyurethane. It has a downwardly converging tapered shape.

The intermediate flange 68 is attached above the block 66. It has a peripheral rim that protrudes radially away from the axis A-A' relative to the stiffening block 66.

The articulated upper assembly 64 comprises multiple tubular vertebrae 70A, 70B axially assembled end-to-end using annular collars 71 (visible in FIG. 2).

The lower vertebra 70B is fastened on a square 72 borne by the intermediate flange 68.

The vertebrae 70A, 70B are slightly movable relative to one another between a linear configuration along the axis A-A' and a slightly curved configuration relative to the linear configuration.

The block 66, the flange 68 and the vertebrae 70A, 70B inwardly delimit a central lumen 76 for circulation the flexible line 18 that defines the circulation axis A-A' of the line 18 in the bend limiter 42, combined with the local longitudinal axis of the line 18.

In the block 66 and in the vertebrae 70A, 70B, the lumen 76 has a transverse section substantially conjugated to the outer transverse section of the line 18.

The blocks 66 and the vertebrae 70A, 70B thus locally impose a bend radius on the flexible line 18 greater than the minimum bend radius that the flexible line 18 may have.

The bend limiter 42 further includes an upper retaining flange 73 designed to receive, by bearing, the lower bearing flange 36 secured to the flexible line 18.

The upper flange 73 protrudes radially from the upper assembly 64. A through opening 73A is formed through the upper flange 73 to accommodate the immobilizing mechanism 46.

As will be seen below, the bend limiter 42 is movable between a disassembled position shown in FIG. 2, in which it is placed separated from the hollow rigid tube 40, and a position assembled on the hollow rigid tube 40, shown in FIGS. 1 and 5, in which the intermediate flange 68 of the limiter 42 is fastened to the lower end of the collar 52.

Figure 5:
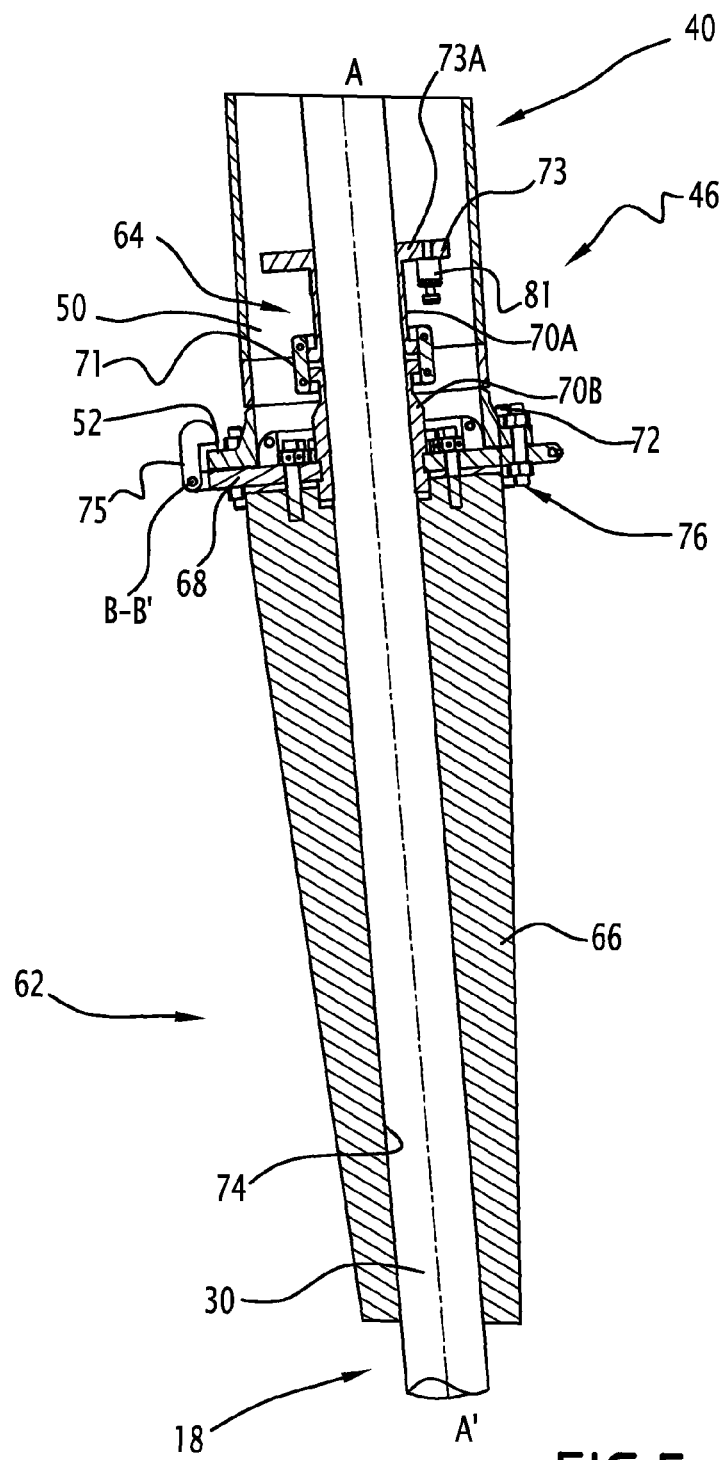
FIG. 5 is a view similar to FIG. 3, during a third step for carrying out a connecting method according to the invention, the releasable immobilizing means having been deactivated.

The fastening assembly 44 comprises pre-fastening members 75 for fastening the bend limiter 42 on the hollow rigid tube 40 and final fastening members 76 for fastening the bend limiter 42 on the hollow rigid tube, shown in FIG. 5.

The pre-fastening members 75 are positioned at the periphery of the intermediate flange 68. They are mounted radially movable relative to the intermediate flange 68, between a radially contracted position for catching on the hollow rigid tube 40 (FIGS. 2, 4 and 5) and a radially separated position for drawing alongside the tube 40 (FIG. 3). The radially contracted position forms an idle position.

In this example, the pre-fastening members 75 are formed by hooks rotatably mounted on the periphery of the flange 68 around respective axes B-B' perpendicular to the axis A-A'.

Figure 4:
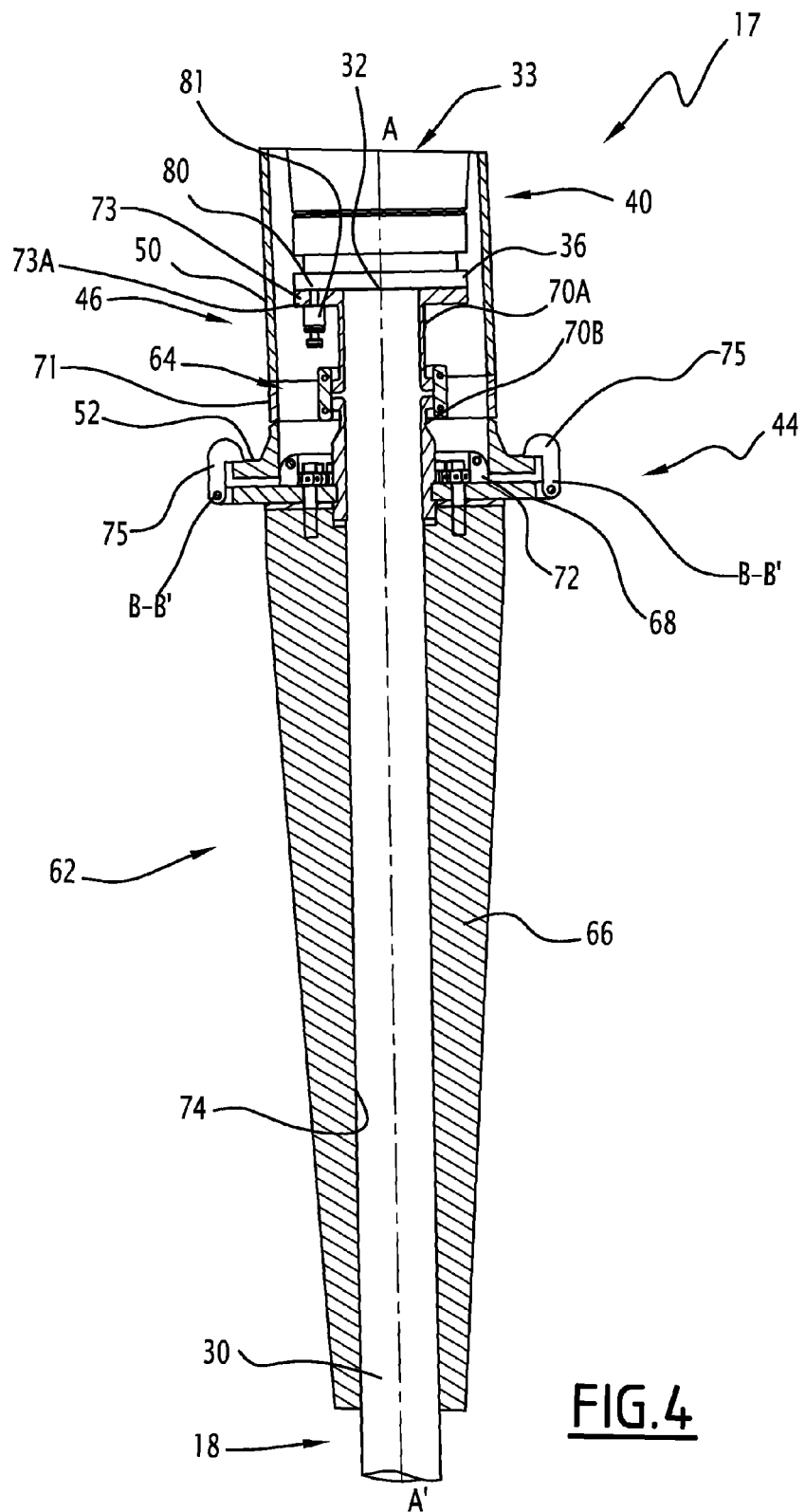
FIG. 4 is a view similar to FIG. 3, during a second step of the connecting method according to the invention.

As illustrated by FIG. 4, the pre-fastening members 75 are designed to be engaged around the end collar 52 of the tube 40 to bear on an upper surface of that collar 52 and thus axially retain the bend limiter 42 while preventing it from moving axially downward.

The pre-fastening members 75 do not oppose the upward axial movement of the bend limiter 42 relative to the tube 40.

The permanent fastening members 76 are capable of keeping the intermediate flange 68 of the bend limiter 42 and the collar 52 of the hollow rigid tube 40 pressed against each other. These members 76 are capable of axially immobilizing the bend limiter 42 upward and downward along the axis A-A' relative to the hollow rigid tube 40.

The fastening members 76 are for example formed by nut-screw systems inserted through the flange 68 and the collar 52 to keep them pressed against each other.

As shown by FIG. 2, the releasable immobilizing mechanism 46 includes a retaining member 80 borne by the flexible line 18 and an engaging assembly 81 assembled on the bend limiter 42.

Figure 6:
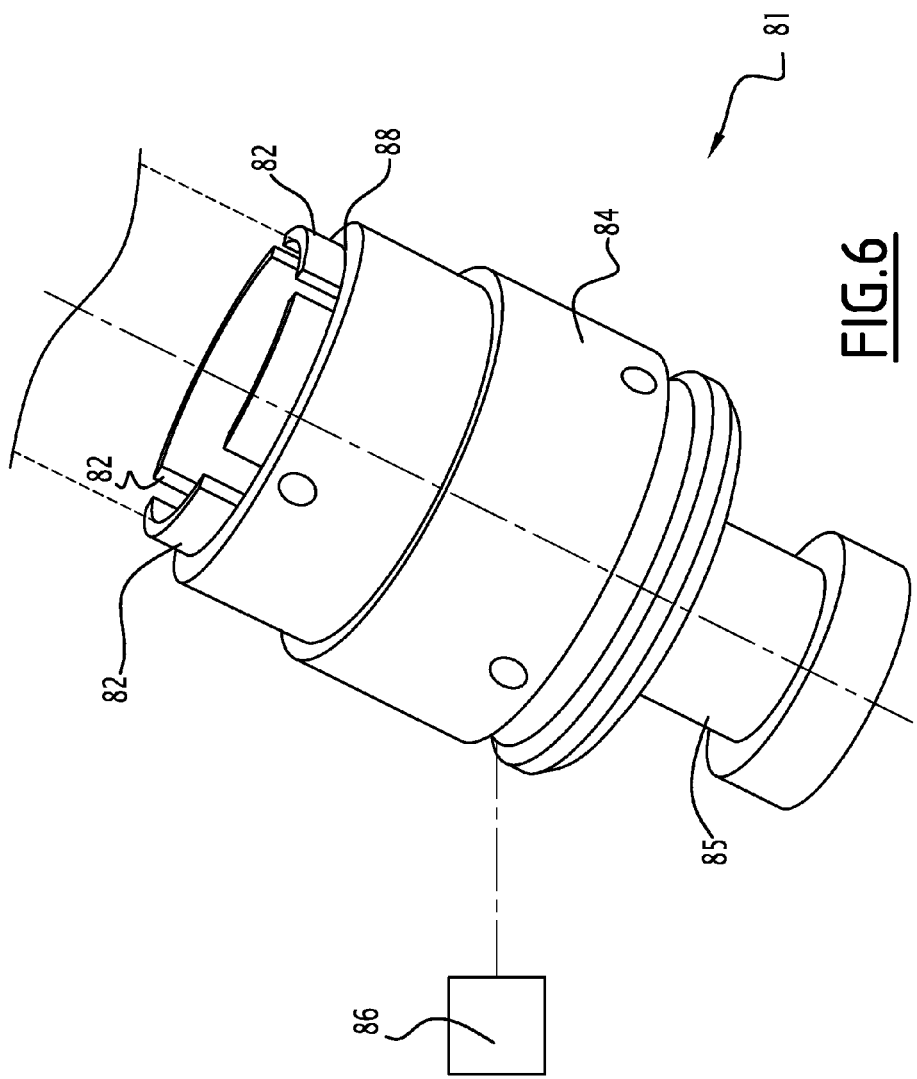
FIG. 6 is a partial perspective view of the releasable immobilizing means, in an activated configuration.
Figure 7:
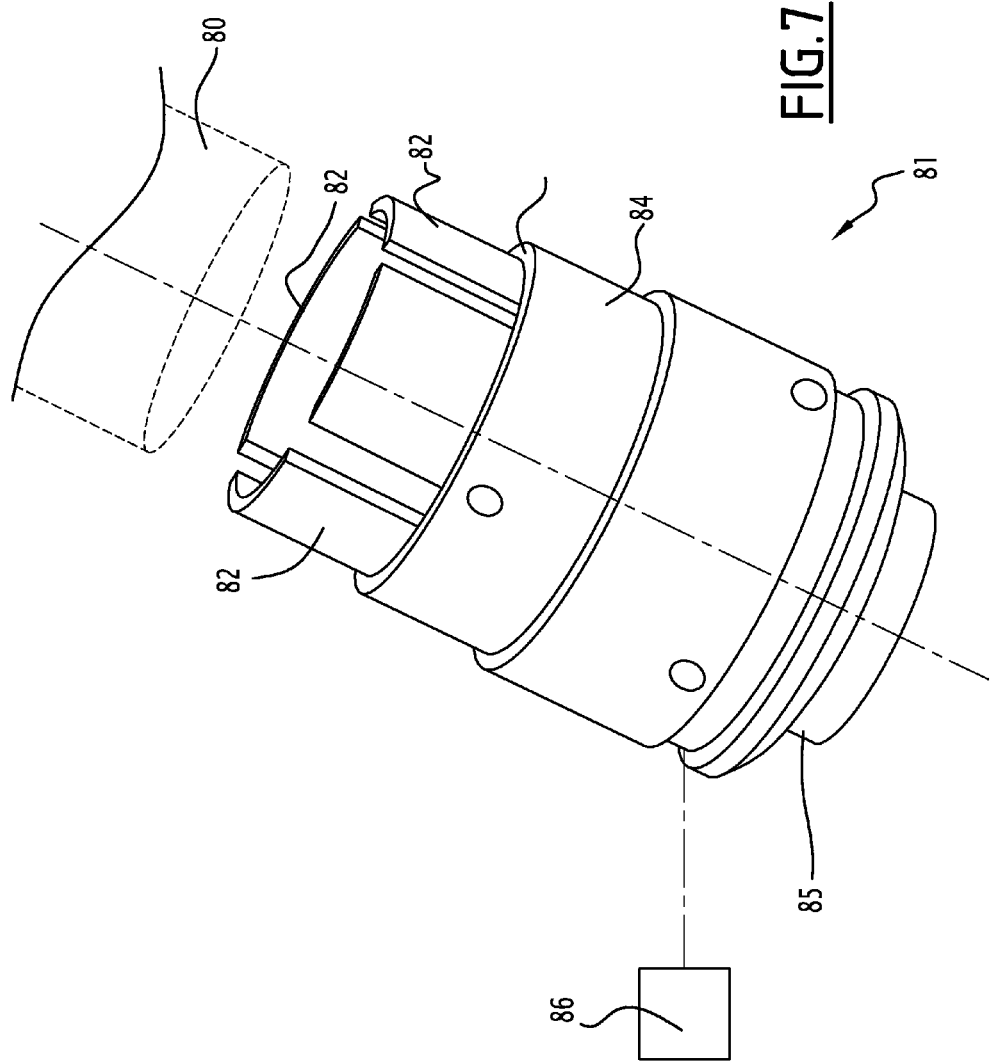
FIG. 7 is a view similar to FIG. 6 in the deactivated configuration.

In reference to FIGS. 6 and 7, the engaging assembly 81 includes multiple moving engaging members 82 designed to be engaged around the retaining member 80. The engaging assembly 81 further includes an outer retaining cage 84 for retaining the moving members 82 and the support piston 85 for the cage 84.

The immobilizing mechanism 46 also includes an actuator 86, shown diagrammatically in FIGS. 6 and 7, designed to move the outer cage 84 to allow the release of the moving members 82.

The retaining member 80 is formed by a rod, advantageously a threaded rod that protrudes downward through the flange 73.

When the head 33 of the flexible line 18 is pressed against the upper flange 73, the retaining member 80 is inserted through the through opening 73A formed in the upper flange 73 and protrudes downward past the upper flange 73 to be received in the engaging assembly 81.

The engaging assembly 81 is for example a segmented nut. Such a segmented nut is for example marketed under the name "HYDRAQUICK" by the company "HYDRATIGHT".

It is mounted below the upper flange 73. The cavity 88 of the cage 84 emerges across from the through openings 73A.

The moving members 82 are formed by separated threaded segments radially movable between a retracted engaged configuration of the retaining member 80, shown in FIG. 6, and a deployed released configuration of the retaining member 80, shown in FIG. 7.

The cage 84 is movably mounted along the axis C-C' of the support piston 85 between a distal retaining position of the moving members 82 and a distal released position of the moving members 82. It delimits an inner cavity 88 for receiving the moving members 82.

In the distal position, the cage 84 outwardly covers the moving members 82. It keeps each moving member 82 in its engaged configuration and prevents each moving member 82 from moving radially toward its released configuration.

In the proximal position of the cage 84, the moving members 82 are radially exposed to the outside and are free to move radially toward the released configuration.

The actuator 86 is for example a hydraulic actuator that can be connected to the cage 84 to cause it to move between the distal position and the proximal position. The actuator 86 is for example borne by a remotely operated vehicle (ROV) and can be reversibly connected on the cage 84.

Alternatively, the actuator 86 is a mechanical actuator.

The releasable immobilizing mechanism 46 can be controlled between an axial activated immobilizing configuration of the flexible line 18 relative to the bend limiter 42, shown in FIGS. 2 to 4, and a deactivated released configuration of the flexible line 18.

The immobilizing mechanism 46 can be activated independently of the movement of the line 18, in particular without having to exert a pulling force on the line 18, by a simple command of the actuator 86.

In the activated configuration of the mechanism 46, the cage 84 is thus in its distal position outwardly covering the moving members 82. The moving members 82 are kept in the retracted configuration. They are capable of engaging the retaining member 80.

In the deactivated configuration, the actuator 86 has moved the cage 84 to its proximal position to radially expose the moving members 82.

The moving members 82 are capable of moving radially toward their deployed configuration to release the retaining member 80.

A method for connecting the flexible line 18 on the floating structure 16 will now be described.

Initially, the bend limiter 42 is engaged around the flexible line 18 and is axially immobilized on the flexible line 18 by means of the immobilizing mechanism 46.

To that end, the pipe 30 is inserted through the rigid lower assembly 62 and the hinged upper assembly 64. The head 33 of the flexible line 18 is placed in contact with the bend limiter 42. The lower flange 36 borne by the flexible line 18 is advantageously applied against the upper flange 73 borne by the bend limiter 42.

The releasable immobilizing mechanism 46 is placed in its activation configuration. The retaining member 80 is inserted through the lower flange 73 of the bend limiter 42 and through the upper flange 36 present on the head 33.

The retaining member 80 then protrudes past the lower flange 73 downward. The free end of the retaining member 80 is then inserted into the inner cavity 88 of the cage 84 between the moving members 82.

The moving members 82 are then in their contracted configuration engaged on the retaining member 80.

In this configuration, the bend limiter 42 is axially fastened on the flexible line 18. The bend limiter 42 and the flexible line 18 are then jointly movable while being fastened on one another.

The assembly formed by the flexible line 18 and the bend limiter 42 is then submerged in the expanse of water 14.

When the line 18 must be connected to the manifold 26 of the structure 16, the winch 24 is activated to lower the cable 28 through the hollow rigid tube 40, then to connect the lower end of the cable 28 to the connection head 33.

The line 18 and the bend limiter 42 are then placed below the end collar 52 of the hollow rigid tube 40, separated from the latter.

Then, the winch 24 is activated to raise the cable 28 toward the upper end 56 of the hollow rigid tube 40. Raising the cable 28 causes the joint movement of the flexible line 18 and the bend limiter 42 toward the collar 52. During that movement, the bend limiter 42 is partially inserted into the rigid tube 40.

As illustrated by FIG. 3, when the upward movement of the flexible line 18 continues, the pre-fastening members 75 come into contact with the peripheral edge of the collar 52. This causes the radial movement toward their separated position shown in FIG. 3.

When the upward movement of the line 18 continues, the free ends of the pre-fastening members 75 pass above the collar 52 and are brought into the contracted position to be pressed against the upper surface of the collar 52. The bend limiter 42 then rests on the hollow tube 40, while being kept in position by the pre-fastening members 75.

Then, in a first alternative, the fastening members 76 are put into place. The intermediate flange 68 of the bend limiter 42 is then pressed against the lower surface of the flange 52 and the fastening members 76 are inserted between the flange 68 and the collar 52 to ensure axial fastening of the bend limiter 42 to the lower end of the hollow rigid tube 40.

Once that is done, the releasable immobilizing member 46 is passed into its deactivated configuration. In this example, the actuator 86 is controlled to move the cage 84 from its distal position, shown in FIG. 6, to its proximal position, shown in FIG. 7.

During this passage, the radial space located outside the moving members 82 is released, allowing a radial movement of each moving member 82, toward the deployed configuration. The retaining member 80 is then released from the moving members 82.

No pulling force is applied on the line 18 to cause the passage into the deactivated configuration. The line 18 remains axially stationary relative to the bend limiter 12 during the transition.

Once this is done, the flexible line 18 is free to move axially upward relative to the bend limiter 42.

The immobilizing mechanism 46 is therefore deactivated independently of the movement of the flexible line 18, without it being necessary to apply a pulling force on the flexible line 18. This considerably limits the risk of deterioration of the flexible line 18.

Furthermore, the reliability of the release of the flexible line 18 is increased, since it is not necessary to have calibrated mechanical parts such as pins. Even if a local traction stress is accidentally applied on the flexible line 18, the releasable immobilizing mechanism 46 is only released when the operator of the device 17 decides to do so, which contributes to ensuring the reliability thereof.

Next, the flexible line 18 is raised through the central lumen of the bend limiter 42 and through the circulation passage of the hollow rigid tube 40, as far as the manifold 26. During that raising, the bend limiter 42 remains immobile relative to the tube 40.

Then, the line 18 is connected to the manifold 26 to allow the circulation of fluid between the bottom assembly (not shown) and the surface structure 16.

In one alternative, the step for installing the fastening members 76 is done after releasing the immobilizing mechanism 46, after raising the flexible line 18 outside the critical path of the operation.

In another alternative, the pre-fastening members 75 are borne by the hollow rigid tube 40 and are for example assembled at the periphery of the lower collar 52 while protruding downward.

In still another alternative, the retaining member 80 of the releasable immobilizing mechanism 46 is borne by the bend limiter 42.

The engaging assembly 81 is then borne by the hollow rigid tube 40. In this alternative, the retaining member 80 protrudes upward from the upper flange 73 of the bend limiter 42. It is inserted into a through opening formed in the lower flange 36 of the head 33 to pass through the flange 36, so as to be engaged with the moving members 82 in the inner cavity 88 of the cage 84.

The operation of this device 17 is similar to that of the device previously described.

Figure 8:
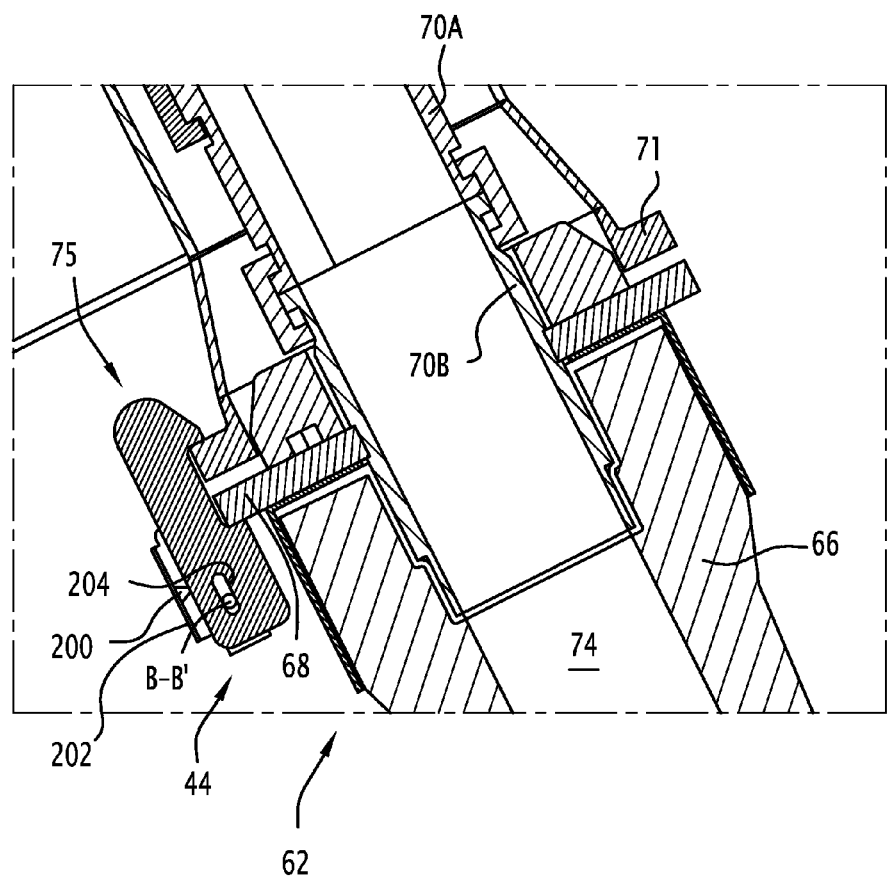
FIG. 8 is a partial view similar to FIG. 4 illustrating an alternative pre-fastening member.

In the alternative illustrated in FIG. 8, the fastening assembly 44 includes a support 200 mounted at the periphery of the intermediate flange 68 and including a part 202 protruding downward relative to the flange 68.

The axis of rotation B-B' of each pre-fastening member 75 is mounted in the protruding part 202. The pre-fastening member has a longitudinal slot 204 for receiving the axis B-B'. It is thus able to move longitudinally perpendicular to the axis B-B' over a given travel.

Such an arrangement further improves the mechanical strength and the reliability of the fastening assembly 44.

What is claimed is:

1. A method for connecting a flexible line to a structure of a fluid exploitation installation, comprising the following steps:

providing a flexible line and a bend limiter axially immobilized around the flexible line by a releasable immobilizing mechanism;

partially inserting the flexible line through a hollow rigid member secured to the structure;

immobilizing the bend limiter on the hollow rigid member;

deactivating the releasable immobilizing mechanism; and moving the flexible line relative to the bend limiter in the hollow rigid member, the bend limiter remaining substantially axially stationary relative to the hollow rigid member, wherein:

the releasable immobilizing mechanism is deactivated independently of the movement of the flexible line with respect to the bend limiter, the releasable immobilizing mechanism includes a retaining member secured to the flexible line and a moving engaging member mounted on the bend limiter, the moving engaging member is a segmented nut, the bend limiter includes an articulated upper assembly comprising multiple tubular vertebrae axially assembled end-to-end, the bend limiter further includes an upper retaining flange protruding radially from the upper assembly, a through opening being formed through said upper retaining flange to accommodate the retaining member of the immobilizing mechanism, and the moving engaging member is configured for being placed in an engaging configuration of the retaining member, the deactivating step including moving the moving engaging member from the engaging configuration to a released configuration of the retaining member, independently of the movement of the flexible line, the retaining member being in the meantime received in the through opening of the upper retaining flange of the bend limiter.

2. The method according to claim 1, wherein the releasable retaining mechanism includes an actuator, controllable then to allow the passage of the moving member from the engaged configuration to the released configuration.

3. The method according to claim 2, wherein the releasable immobilizing mechanism includes a cage for retaining the moving member, and in that during the deactivating step, the actuator moves the retaining cage between a first position keeping the moving member in the engaged configuration and a second position in which the moving member is capable of going into the released configuration.

4. The method according to claim 1, wherein the flexible line includes at least one bearing flange, the retaining flange of the bend limiter being pressed on the bearing flange when the releasable immobilizing mechanism is activated, the releasable immobilizing mechanism keeping the bearing flange pressed on the retaining flange during the immobilization of the bend limiter on the hollow rigid member, the bearing flange being free to move relative to the retaining flange after the releasable immobilizing mechanism is deactivated.

5. The method according to claim 1, wherein the hollow rigid member includes at least one retaining collar, the bend limiter including at least one pre-fastening member on the collar, the engaging of the bend limiter on the hollow rigid member including engaging the pre-fastening member on the collar.

6. The method according to claim 1, including, before or after the step for deactivating the releasable immobilizing member, the permanent fastening of the bend limiter on the hollow rigid member using at least one fastening member.

7. The method according to claim 1, wherein the actuator of the releasable retaining mechanism is a hydraulic actuator.

8. A connecting installation for being mounted on a structure of a fluid exploitation installation, said connecting installation including:
- a flexible line;
- a hollow rigid member configured to be fastened on the structure, the flexible line being configured to be engaged through the hollow rigid member;
- a bend limiter engaged around the flexible line, the bend limiter being configured to be axially immobilized on the hollow rigid member;
- a releasable axial immobilizing mechanism for immobilizing the flexible line on the bend limiter, the releasable immobilizing mechanism being capable of being deactivated independently of the movement of the flexible line relative to the bend limiter, and the releasable immobilizing mechanism including a retaining member secured to the flexible line and a moving engaging member mounted on the bend limiter, wherein:
- the moving engaging member is a segmented nut,
- the bend limiter includes an articulated upper assembly comprising multiple tubular vertebrae axially assembled end-to-end,
- the bend limiter further includes an upper retaining flange protruding radially from the upper assembly, a through opening being formed through said upper retaining flange to accommodate the retaining member of the immobilizing mechanism, and
- the moving engaging member is configured for being placed in an engaging configuration of the retaining member, said moving engaging member being movable from the engaging configuration toward a released configuration of the retaining member independently of the movement of the flexible line, the retaining member being in the meantime received in the through opening of the upper retaining flange of the bend limiter.

9. The connecting installation according to claim 8, wherein the releasable retaining mechanism includes an actuator controllable then to allow the passage of the moving member from the engaged configuration to the released configuration.

10. The connecting installation according to claim 9, wherein the releasable immobilizing mechanism includes a cage for retaining the moving member, and wherein the actuator can be controlled to move the retaining cage between a first position keeping the moving member in the engaged configuration and a second position in which the moving member is capable of going into the released configuration.

11. The connecting installation according to claim 8, wherein the flexible line includes at least one bearing flange, the retaining flange of the bend limiter being pressed on the bearing flange when the releasable immobilizing mechanism is activated, the releasable immobilizing mechanism keeping the bearing flange pressed on the retaining flange during the immobilization of the bend limiter on the hollow rigid member, the bearing flange being free to move relative to the retaining flange after the releasable immobilizing mechanism is deactivated.

12. The connecting installation according to claim 8, wherein the hollow rigid member includes at least one retaining collar, the bend limiter including at least one pre-fastening member on the collar.

13. The connecting installation according to claim 8, including at least one fastening member for fastening the bend limiter on the collar capable of axially immobilizing the bend limiter relative to the collar.

14. The connecting installation according to claim 8, wherein the actuator of the releasable retaining mechanism is a hydraulic actuator.

* * * * *